United States Patent [19]
Rademacher

[11] 3,986,900
[45] Oct. 19, 1976

[54] PROCESS FOR THE PRODUCTION AND STORAGE OF A PROTECTIVE GAS FOR THE ANNEALING OF STEEL AND OTHER METALS

[75] Inventor: Christian Rademacher, Kaarst, Germany

[73] Assignee: Messer Griesheim GmbH, Frankfurt am Main, Germany

[22] Filed: Jan. 16, 1975

[21] Appl. No.: 541,392

[30] Foreign Application Priority Data
Jan. 18, 1974 Germany............................ 2402266

[52] U.S. Cl..................................... 148/27; 148/16; 148/20.3; 252/372
[51] Int. Cl.$^2$...................... B23K 35/24; C01B 2/00
[58] Field of Search ................ 148/16, 27, 28, 20.3; 252/372

[56] References Cited
UNITED STATES PATENTS

| | | | |
|---|---|---|---|
| 2,130,163 | 9/1938 | Tiddy et al........................... | 252/372 |
| 2,296,434 | 9/1942 | Ghelardi et al...................... | 252/372 |
| 3,111,400 | 11/1963 | Hoff.................................... | 252/372 |
| 3,330,773 | 7/1967 | Hart.................................... | 252/372 |

FOREIGN PATENTS OR APPLICATIONS

| | | | |
|---|---|---|---|
| 1,152,227 | 5/1969 | United Kingdom................. | 252/372 |

Primary Examiner—Walter R. Satterfield
Attorney, Agent, or Firm—Connolly and Hutz

[57] ABSTRACT

A protective gas for annealing steel and other metals is characterized by a mixture of nitrogen and 0.2% by volume to 50% by volume of carbon monoxide.

3 Claims, No Drawings

PROCESS FOR THE PRODUCTION AND STORAGE OF A PROTECTIVE GAS FOR THE ANNEALING OF STEEL AND OTHER METALS

BACKGROUND OF THE INVENTION

The invention relates to a protective gas for annealing steel and other metals. For bright-annealing of steel and other metals, protective gases have been used for many years, which gases were obtained by partial combustion of gas or oil. The CO-, $H_2$-, $CO_2$-, $CH_4$- and $N_2$-contents of these gases differ very much, according to the starting fuel, the factor for the air of combustion, and the process used for the production of the protective gas. However, common to these gases are low $O_2$- and $H_2O$-contents.

For some time nitrogen, which is obtained by decomposition of air, has been used to an increasing extent for bright-annealing. Conditioned by the production process, the $O_2$- and $H_2O$-contents of the nitrogen are extremely low. It has been proved by numerous labor- and plant-bright-annealing tests, and its use for years in operation that nitrogen is suitable for bright-annealing of many steel and metal kinds, in different furnaces, and that the addition of reducing gases (e.g. $H_2$) is not required. When in spite of this, numerous annealings add to the nitrogen 1–5% $H_2$, then either in order to bind the oxygen penetrating through leakiness of the furnace or to be able to reduce oxygen compounds which are brought into the furnace with the annealing material and/or with the rolling- or drawing material adhering to it, are brought into the furnace.

The method of the supply of nitrogen to the annealings depends substantially upon the amounts required. For little consumption, gas bottles are used for medium consumption bales of bottles. If the consumption is higher, liquid nitrogen is supplied and is stored in the liquid, intensely-cold state in a container suitable for it. The amount required in each case is converted upon demand into the gaseous state and conducted to the place of consumption. In the case of bottle- and bales of bottle supply, $N_2$—$H_2$-mixtures are delivered in the desired concentration as so-called forming gases.

The hydrogen, which is required for the production of $N_2$—$H_2$-mixtures, when liquid nitrogen is used, is delivered in gaseous form in bottles or bales of bottles to the consumer and is mixed there with the nitrogen in the desired concentration, by means of a mixing device.

This method has been approved and found reliable for years. However, a disadvantage of it is that the costs for a mixing device must be spent, and that the transportation and handling of glass bottles and bales of glass bottles is relatively expensive.

These disadvantages are avoided by a process, which is based on the solubility of hydrogen in liquid nitrogen, in dependence upon the partial hydrogen pressure existing above the liquid phase. The advantages of this process are that no mixing device is required, and that — inasmuch as the $N_2$—$H_2$-mixture is delivered in the liquid state — the relatively expensive handling with $H_2$-bottles or $H_2$-bales of $H_2$-bottles, and the transportation of the glass bottles or bales of glass bottles is eliminated. A disadvantage of this process consists in the fact that hydrogen dissolves in liquid nitrogen only, when above the liquid phase a correspondingly high $H_2$-partial pressure (about 1 bar/0.2% $H_2$) is maintained. It results therefrom that the cold gasifiers must be driven with high operating pressures, when higher $H_2$-contents (e.g. 3–5%) shall be adjusted. Another difficulty results from the fact that the $H_2$-partial pressure above the liquid phase must not be substantially changed, when defined $H_2$-contents shall be maintained. By each withdrawal from the gas phase above the liquid phase, the $H_2$-content of the mixture is reduced. Beyond that, there exists withdrawal from the high $H_2$-containing gas phase, danger of explosion, when as upon working with low-percentage $N_2$—$H_2$-mixtures no such customary precautionary means are taken. Furthermore, that the cold-gasifier and tank vehicle must be made $H_2$-tight, must be considered a disadvantage.

SUMMARY OF INVENTION

The invention is based on the task to create a protective gas, containing a reducing agent, for the annealing of steel and other metals, whose components can in the liquid state be mixed in the simple way, respectively, whose components are in the liquid state soluble in each other, and for which during the withdrawal from the liquid or gaseous phase, no danger of disintegration exists.

This is obtained according to the invention by a mixture of nitrogen and 0.2% by volume to 50% by volume, preferably 0.5% by volume, to 10% by volume, of carbon monoxide.

DETAILED DESCRIPTION

Operational annealing tests showed that $N_2$—CO-mixtures give by annealing of steel at least equally good or better results, than $N_2$—$H_2$-mixtures. Thus, it was possible to avoid under certain operating conditions, when annealing high-coal wide strips, under $H_2$—$H_2$-mixture, respectively, under monogas, occurring branch-shaped, annealing flanges, by annealing under $N_2$—CO-mixture, by maintaining certain annealing conditions, far-reachingly. Also the marginal decarbonization, occurring upon annealing of high-coal wires under $N_2$—$H_2$-mixture, under certain operating conditions, can be reduced or prevented, by entering $N_2$—CO-mixture. That CO is very suitable for mixing with liquid nitrogen, results from the physical data:

|  | Molecular Weight | Melting Temp. (° K.) | Melting Heat (kcal/kg) | Density, liquid (kg/l) | Boiling Temp. (° K.) | Heat of Evaporation (kcal/NM$^3$) |
|---|---|---|---|---|---|---|
| $N_2$ | 28.016 | 63.2 | 6.1 | 0.812 | 77.4 | 59.6 |
| CO | 28.011 | 68.1 | 7.2 | 0.799 | 81.7 | 64.3 |

|  | Critical Temperature (° K) | Point Pressure (bar) | Gas State Density (kg/Nm$^3$) | spec. Heat $c_p$ kcal/Nm$^3$ ° C. | Thermal Conductivity (kcal/mh° C) |
|---|---|---|---|---|---|
| $N_2$ | 126.3 | 34.6 | 1.2499 | 0.310 | 0.0206 |
| CO | 133.0 | 35.7 | 1.2497 | 0.312 | 0.0193 |

These liquid $N_2$—CO-mixtures according to the invention can be prepared by introducing pure, gaseous CO-, preferably low-precooled (heat of evaporation of CO = 64.3 kcal/Nm$^3$) into — preferably low-cooled — liquid nitrogen, or liquefied pure CO is mixed with liquid $N_2$.

However, for the production of these liquid $N_2$—CO-mixtures, also CO-, $N_2$- and $CO_2$-containing reaction — respectively combustion-gases can be applied. Because of its composition, blast furnace top gas is especially suited for this. The top gas of blast furnaces is composed about as follows:

| | |
|---|---|
| $CO_2$ | 10–16 % |
| CO | 25–30 % |
| $H_2$ | 1–4 % |
| $CH_4$ | 1–3 % |
| $N_2$ | 52–60 % |

Top gas also contains $SO_2$ and $H_2O$-vapor (steam).

In order to obtain a $N_2$—CO-mixture suitable for the annealing, $CO_2$, $SO_2$, $H_2O$ and $CH_4$, must be removed from the top gas, and the thus obtained residual gas must be cut (diluted) with $N_2$. In order to avoid concentration of hydrogen in the gas phase above the liquid phase, also the hydrogen contained in the gas used as CO-carrier must be separated.

$CO_2$ and $SO_2$ can be removed from the gas used as CO-carrier by means of lye or by fractional liquefaction, $CH_4$ and $H_2$ by fractional liquefaction. The $CO_2$ can also be removed from the gas by reduction to CO.

Depending upon the composition of the gas used as CO-carrier, and if the $CO_2$ is separated or reduced to CO, and depending also upon the height of the CO-content desired in the protective gas, for about 3 to 60 parts $N_2$ 1 part of CO-carrier gas is required. Therefore, in comparison with the $N_2$-amount, only small amounts of CO-carrier gas are required.

Since the protective gas according to the invention is poisonous because of the CO-content, care has to be taken, that the entire gas is sucked off after leaving the furnace and is conducted into the open, or blazed off reliably by means of an igniting flame. By pumping around of liquid $N_2$—CO-mixture, a certain amount of the mixture evaporates at the beginning of the process. Endangering of the service people at this process can be avoided by pre-rinsing with pure, gaseous, or liquid nitrogen. However, it is the most expedient that upon pre-rinsing of the tank hoses, the $N_2$—CO-gas thus formed is led into the open via a waste-gas pipe, which can be sealed off by means of a valve, the waste-gas pipe being connected to the filling pipe of the storage container. If necessary, the $N_2$—CO-gas, being led off via this waste-gas exhaust pipe, can be blazed off at the mouth of this pipe.

What is claimed is:

1. A process for the preparation of a protective gas consisting of nitrogen and carbon monoxide for the annealing of steel and other metals comprising the steps of preparing the gas in a liquid state, storing the gas in a liquid state, transporting the gas to the annealing site in a liquid state and vaporizing the gas at the site of consumption, and the liquid state preparing step including mixing a first gas selected from the group consisting of carbon monoxide and a nitrogen-carbon monoxide mixture with a second gas selected from the group consisting of carbon monoxide and nitrogen and a nitrogen-carbon monoxide mixture, said second gas being in liquid form, said first gas being carbon monoxide when said second gas is a mixture of nitrogen and carbon monoxide and said first gas being a nitrogen-carbon monoxide mixture when said second gas is nitrogen and when said second gas is carbon monoxide whereby said first and second gases are different and whereby one of said first and second gases in a nitrogen-carbon monoxide mixture, the carbon monoxide content of the protective gas being from 0.2% by volume to 50% by volume, and said nitrogen-carbon monoxide mixture being obtained from blast furnace top gas with $H_2$, $CO_2$, $SO_2$ $H_2O$ and $CH_4$, removed therefrom.

2. The process of claim 1 wherein the carbon monoxide content is from 0.5% to 10% by volume.

3. The process of claim 1 including conducting the vaporized gas to an annealing device to create a protective gas atmosphere while an annealing step takes place.

* * * * *